United States Patent
Coulombe

(10) Patent No.: US 7,103,681 B2
(45) Date of Patent: Sep. 5, 2006

(54) SYSTEM FOR RENDERING MULTIMEDIA MESSAGES BY PROVIDING, IN A MULTIMEDIA MESSAGE, URL FOR DOWNLOADABLE SOFTWARE TO RECEIVING TERMINAL

(75) Inventor: Stephane Coulombe, Irving, TX (US)

(73) Assignee: Nokia Corporation, Espoo (FI)

( * ) Notice: Subject to any disclaimer, the term of this patent is extended or adjusted under 35 U.S.C. 154(b) by 54 days.

(21) Appl. No.: 10/601,278

(22) Filed: Jun. 19, 2003

(65) Prior Publication Data
US 2005/0021834 A1 Jan. 27, 2005

(51) Int. Cl.
G06F 15/16 (2006.01)
G06F 15/00 (2006.01)
G06F 17/00 (2006.01)
G06F 17/21 (2006.01)
G06F 17/24 (2006.01)
G06F 9/44 (2006.01)

(52) U.S. Cl. .............. 709/246; 709/203; 709/206; 709/207; 709/230; 715/500; 717/168

(58) Field of Classification Search .......... 709/203, 709/219, 220, 227, 230, 246, 217, 201, 245, 709/206, 207; 707/4, 104.1; 717/168; 715/500
See application file for complete search history.

(56) References Cited

U.S. PATENT DOCUMENTS

| | | | |
|---|---|---|---|
| 5,715,397 A * | 2/1998 | Ogawa et al. | 709/246 |
| 5,870,610 A * | 2/1999 | Beyda | 717/173 |
| 5,935,210 A * | 8/1999 | Stark | 709/224 |
| 5,987,430 A * | 11/1999 | Van Horne et al. | 705/34 |
| 6,023,586 A * | 2/2000 | Gaisford et al. | 717/178 |
| 6,167,441 A * | 12/2000 | Himmel | 709/217 |
| 6,185,625 B1 * | 2/2001 | Tso et al. | 709/247 |
| 6,247,050 B1 * | 6/2001 | Tso et al. | 709/224 |
| 6,389,467 B1 * | 5/2002 | Eyal | 709/223 |
| 6,421,733 B1 * | 7/2002 | Tso et al. | 709/246 |
| 6,434,578 B1 * | 8/2002 | McCauley et al. | 715/517 |
| 6,693,652 B1 * | 2/2004 | Barrus et al. | 715/838 |
| 6,757,732 B1 * | 6/2004 | Sollee et al. | 709/227 |
| 6,976,082 B1 * | 12/2005 | Ostermann et al. | 709/231 |
| 2001/0047400 A1 * | 11/2001 | Coates et al. | 709/219 |
| 2001/0048436 A1 * | 12/2001 | Sanger | 345/467 |
| 2002/0016818 A1 * | 2/2002 | Kirani et al. | 709/203 |
| 2002/0073197 A1 * | 6/2002 | Bhogal et al. | 709/224 |
| 2002/0073220 A1 * | 6/2002 | Lee | 709/231 |
| 2002/0080271 A1 * | 6/2002 | Eveleens et al. | 348/473 |
| 2002/0120693 A1 * | 8/2002 | Rudd et al. | 709/206 |
| 2002/0120779 A1 * | 8/2002 | Teeple et al. | 709/246 |
| 2002/0131561 A1 * | 9/2002 | Gifford et al. | 379/67.1 |
| 2003/0003876 A1 * | 1/2003 | Rumsey | 455/74 |
| 2003/0055867 A1 * | 3/2003 | King | 709/201 |
| 2003/0152203 A1 * | 8/2003 | Berger et al. | 379/93.24 |
| 2004/0075675 A1 * | 4/2004 | Raivisto et al. | 345/700 |
| 2004/0181550 A1 * | 9/2004 | Warsta et al. | 707/104.1 |

* cited by examiner

Primary Examiner—Saleh Najjar
Assistant Examiner—Michael Y. Won

(57) ABSTRACT

This invention describes an adaptation system providing terminal-specific uniform resource locators (URLs) of downloadable software allowing a receiving terminal to render originally unsupported components of multimedia messages. The URLs are provided to the receiving terminal by a multimedia messaging service center (MMSC) which identifies the URLs from its database using information on the receiving terminal capabilities (i.e. based on terminal model and software release) and possibly multipurpose internet mail extension (MIME) types of originally unsupported components in multimedia messages.

32 Claims, 2 Drawing Sheets

SYSTEM FOR RENDERING MULTIMEDIA MESSAGES BY PROVIDING, IN A MULTIMEDIA MESSAGE, URL FOR DOWNLOADABLE SOFTWARE TO RECEIVING TERMINAL

FIELD OF THE INVENTION

The invention relates to adaptation of multimedia messages by a multimedia messaging service center (MMSC) and more specifically providing the MMSC that enables a receiving terminal to render multimedia messages in generally unsupported formats.

BACKGROUND OF THE INVENTION

A problem in multimedia messaging services is that terminals have very different capabilities (supported media formats, maximum image resolution, maximum message size, etc.). This creates interoperability problems. To reduce this problem, multimedia messaging service centers (MMSC) can adapt messages to the specific terminal capabilities. These capabilities are obtained through UAProf or deduced from HTTP/WSP headers such as a User Agent header (UAHEADER) and Accept headers. However, there are cases where the MMSC cannot adapt without significantly deteriorating the quality of the content or it does not have the functionality to do so. An example of the first case is converting a video clip to an image (e.g. extracting the first frame of the video clip). An example of the second case is if the message contains an image in PNG format (not supported by the receiving terminal) and the MMSC cannot convert PNG to an image format supported by the terminal (e.g. converting PNG to GIF). In these cases, user experience is drastically reduced.

In the current state of the art, the MMSC tries its best to adapt each media component to a format that is supported by the terminal (based on the reported capabilities). However, the MMSC transcoding capabilities may be limited only to a small set of formats. For example, the Nokia MMSC can convert GIF to JPEG and video to JPEG but those are about the only image format conversions supported so far. When the message quality is reduced too much, the message can also be forwarded to an e-mail address or legacy terminal support (some Web server for messages). Nevertheless usability is significantly reduced at a receiving terminal (e.g. when converting a video clip to a single image). For many other formats (PNG, PBM, etc.), the MMSC cannot perform the adaptation at all. Those components are still sent to the terminal if they fit within the multimedia messaging service message size restriction, but they may be unusable on the terminal side.

Thus, it is desirable to increase interoperability between terminals by providing an easy way for terminals to render originally unsupported components of the multimedia messages. It is also desirable to improve the user experience by providing easy assurance that messages can be adapted and to avoid cases where the MMSC just sending an unsupported component (with which the terminal doesn't know what to do) or dropping it. It is further desirable to increase performance of already deployed mobile phones.

SUMMARY OF THE INVENTION

The object of the present invention is to provide a system for rendering multimedia messages by providing a terminal-specific uniform resource locator (URL) for downloadable software to a receiving terminal.

According to a first aspect of the present invention, a method for rendering multimedia messages comprises the steps of: providing a multimedia messaging service signal incorporating a further multimedia message signal (FMMS) indicative of a multimedia message and a terminal-specific uniform resource locator (URL) signal from a multimedia messaging service center to a receiving terminal, said URL signal providing an Internet server location of software obtainable by the receiving terminal; and providing the software to the receiving terminal for rendering the multimedia message by the receiving terminal.

In further accord with the first aspect of the invention, the software is provided to the receiving terminal in response to a software request signal sent by the receiving terminal to the Internet server location provided by the URL signal; wherein the software request signal may be sent by the receiving terminal to the Internet server location provided by the URL signal automatically after receiving the multimedia messaging service signal incorporating the URL signal, or the software request signal may be sent by the receiving terminal to the Internet server location provided by the URL signal only after receiving a software request command from a user.

Still further according to the first aspect of the invention, after the step of providing the multimedia messaging service signal, the method further comprises the step of deciding whether additional software is needed to be installed in the receiving terminal for rendering originally unsupported components of a multimedia message signal by the receiving terminal; wherein said decision may be made by the user or said decision may be made automatically by the receiving terminal.

Further still according to the first aspect of the invention, the method further comprises the step of rendering the further multimedia message signal indicative of the multimedia message by the receiving terminal, so that the multimedia message is perceptible by a user.

In further accordance with the first aspect of the invention, prior to the step of providing the multimedia messaging service signal, the method further comprises the step of receiving and optionally storing the multimedia message signal by the multimedia messaging service center.

Yet further still according to the first aspect of the invention, the method further comprises an optional step of providing a message notification signal to the receiving terminal by the multimedia messaging service center.

According further to the first aspect of the invention, the method further comprises the step of providing a message retrieval request signal containing a terminal signal indicative of a terminal information and optionally a multipurpose internet mail extension (MIME) signal indicative of a terminal-specific MIME information to the multimedia messaging service center by the receiving terminal. Further, the message retrieval request signal may be sent in response to the message notification signal. Still further, the MIME information may be deduced by the multimedia messaging service center from the terminal information contained in the message retrieval request signal and from a software release information. Also further, a terminal signal indicative of a terminal information may be provided to the multimedia messaging service center during a registration process of a particular application, wherein the particular application may be a session initiation protocol (SIP) instant messaging or a SIP messaging session. Still also further, a terminal-specific multipurpose internet mail extension (MIME) information may be deduced by the multimedia messaging service center from the terminal information and from a software release information.

According still further to the first aspect of the invention, the method further comprises the step of evaluating by the multimedia messaging service center whether it is appropriate to adapt unsupported components of the MMS to meet the capabilities of the receiving terminal and identifying the URLs for terminal-specific additional software to render the unsupported components of the multimedia message signal based on the terminal and MIME signals using a database of the multimedia messaging service center.

According still further to the first aspect of the invention, the method further comprises the step adapting by the multimedia messaging service center the appropriate unsupported components of the MMS to meet the capabilities of the receiving terminal.

According to a second aspect of the invention, a system comprises a multimedia messaging service center, for providing a multimedia message service signal incorporating a further multimedia message signal indicative of a multimedia message and a terminal-specific uniform resource locator (URL) signal, said URL signal providing an internet location of downloadable software; and a receiving terminal responsive to the multimedia message service signal, for obtaining said software for rendering the multimedia message.

According further to the second aspect of the invention, the multimedia messaging service center is further responsive to a multimedia message signal indicative of the multimedia message and to a message retrieval request signal containing a terminal signal indicative of a terminal information and optionally a multipurpose internet mail extensions (MIME) signal indicative of a terminal-specific MIME information. Also, the multimedia messaging service center may further provide a message notification signal to the receiving terminal.

Further according to the second aspect of the invention, the receiving terminal is further responsive to a software request command by a user, provides a message retrieval request signal containing a terminal signal indicative of a terminal information and optionally a multipurpose internet mail extensions (MIME) signal indicative of a terminal-specific MIME information, provides a software request signal to an Internet server, provides a URL image signal to the user, and renders the further multimedia message signal indicative of the multimedia message perceptible by the user. Also, the receiving terminal may be responsive to a message notification signal.

Still further according to the second aspect of the invention, the system further comprises a sending terminal, for providing a multimedia message signal to the multimedia messaging service center.

According to a third aspect of the invention, a multimedia messaging service center comprises a database for identifying uniform resource locators (URLs) of terminal-specific downloadable software; and means for providing a multimedia message service signal to a receiving terminal, incorporating a further multimedia message signal (FMMS) indicative of a multimedia message and a URL signal, said URL signal providing an internet server location of the terminal-specific downloadable software for rendering unsupported components of the FMMS by the receiving terminal.

According to a fourth aspect of the invention, a receiving terminal, comprises means responsive to the multimedia message service signal, incorporating a further multimedia message signal (FMMS) indicative of a multimedia message and a terminal-specific uniform resource locator (URL) signal, said URL signal providing an Internet server location of software obtainable by the receiving terminal; and means for sending a software request signal to the Internet server location provided by the URL signal.

BRIEF DESCRIPTION OF THE DRAWINGS

For a fuller understanding of the nature and objects of the present invention, reference is made to the following detailed description taken in conjunction with the following drawings, in which.

BEST MODE FOR CARRYING OUT THE INVENTION

This invention is about having a multimedia messaging service center (MMSC) providing to a receiving terminal, in an adapted multimedia messaging service signal (MMSS), a uniform resource locator (URL) signal indicative of where to obtain media handling/decoding software that allows the receiving terminal to support the media content in the MMSS. The MMSC provides the URLs that are specific to the receiving terminal based on the terminal capabilities received (i.e. based on the terminal model and software release for instance) and possibly the multipurpose internet mail extension (MIME) types of originally unsupported components. For example, the video decoding software are different for a Nokia phone and an Ericsson phone, therefore, the URLs for these two phones are different. URL information is embedded in the MMSS and inserted during the message adaptation processing. For that, the MMSC needs to have a database associating the URLs with media formats (MIME types) and phone types. Having these URLs, the user goes to those locations, downloads and installs the software, and finally renders the message components in the message that it previously could not handle.

Figure 1:
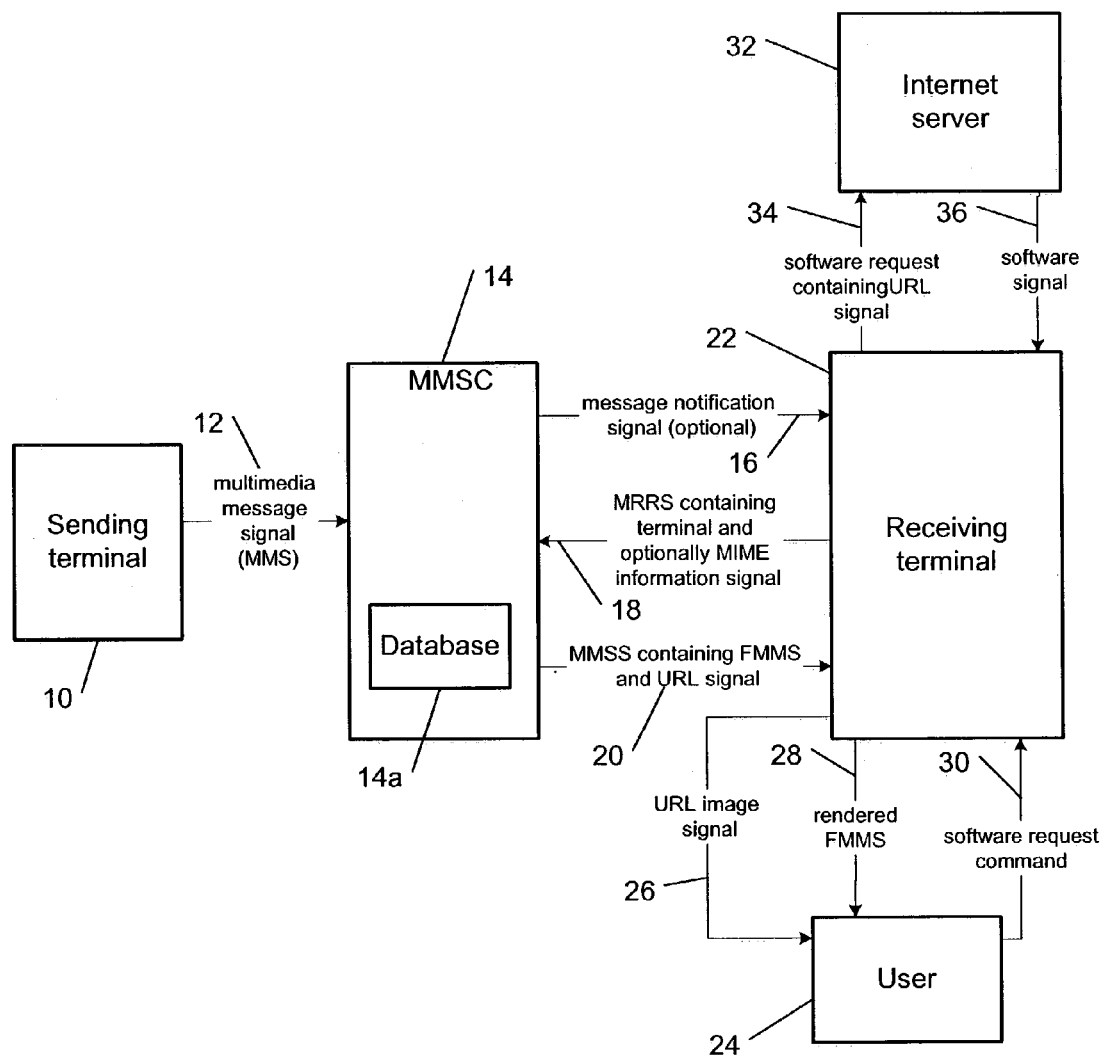
FIG. 1 is a block diagram representing a system configuration, according to the present invention.

FIG. 1 is a block diagram representing a system configuration, according to the present invention. A sending terminal 10 sends a multimedia message signal (MMS) 12 indicative of a multimedia message (MM) to a multimedia messaging service center (MMSC) 14. In the present invention, the multimedia message has a broad interpretation including, but not limited to, traditional multimedia messages (combination of multiple forms of media in the communication of information such as audio, video, text, graphics, etc), the Multimedia Messaging Service defined in Open Mobile Alliance (OMA), in 3GPP and 3GPP2, e-mails, instant messages (such but not limited to IETF SIMPLE, Wireless Village, OMA Instant Messaging and Presence Services (IMPS)), etc. In an extreme case, the multimedia message can be a response to a request to a Web server. Similarly, the MMSC has a broad interpretation including, but not limited to, an MMSC defined in OMA/3GPP Multimedia Messaging Service, an e-mail server, servers and proxies for Instant Messages, and Web servers.

The MMSC 14 receives the MMS 12 and can store it. MMSC 14 may provide a message notification signal 16 to a receiving terminal (RT) 22 (such as a mobile telephone, a personal digital assistant or a computer) which notifies the receiving terminal 22 and optionally a user 24 about the multimedia message. In certain instances (for example, e-mail) the MMSC 14 will not provide the message notification signal 16 to the receiving terminal 22 and therefore sending the message notification signal 16 is generally optional. In the case of e-mail, the terminal 22 or the user 24 typically verifies periodically for new messages at the MMSC 14. The receiving terminal 22 provides a message retrieval request signal (MRRS) 18 to the MMSC 14. The MRRS 18 could be in response to the message notification signal 16 or it could be a stand-alone request, for example, for e-mail messages. The MRRS 18 contains information about capabilities of the receiving terminal 22 (e.g. based on the terminal model and software release, UAProf or other means) and possibly multipurpose internet mail extension (MIME) types for the describing the supported media components. Note that if the MIME types are not provided, they often can be deduced from the terminal model and software release by the MMSC 14. The MMSC 14 evaluates the content of the MMS 12 vs. the receiving terminal 22 and MIME information to determine whether each component of the multimedia message is supported by the receiving terminal 22 and if additional software in the receiving terminal 22 is required for rendering the originally unsupported components of the MMS 12.

If the receiving terminal 22 fully supports all of the components of the MMS 12, the MMSC 14 sends a multimedia messaging service signal (MMSS) 20 containing the MMS 12 to the receiving terminal 22, and the latter renders the MMS 12, and the rendered multimedia message 28 is perceived by the user 24. If, on the other hand the receiving terminal 22 does not support all of the components of the MMS 12, the MMSC 14 decides if it is more appropriate to adapt the unsupported components to the existing receiving terminal 22 capabilities (through quality reduction, image resolution reduction, format conversion, etc.), or to provide information to the receiving terminal 22 about the location of software that would allow it to support those components, or to do both (e.g. convert to a format that is not supported by the terminal, giving a better user experience compared to converting to a supported format, and for which software exists for the terminal to render it). The first case is what typically happens today. In the second case, the MMSC 14 uses its database 14a to identify one or more uniform resource locators (URLs) for the additional software needed to be installed in the receiving terminal 22 for rendering the originally unsupported components of the MMS 12. The database 14a can be organized in many ways. One way is to provide it with USER-AGENT header (providing terminal model and software release) and MIME type and it returns the URL of the software available to render such MIME type for the terminal associated with the given USER-AGENT. The database 14a can return many URLs if for instance many software alternatives exist (e.g. from different vendors). Note that the terminal capability information can be contained not only in the MRRS 18 but can also come from other sources such as a user profile database which can be a part of the MMSC 14 (or external). The MMSS 20 sent by the MMSC 14 to the receiving terminal 22 contains both the adapted version of the MMS 12 (a further multimedia message signal, FMMS, indicative of the multimedia message) and a URL signal for each software needed to render the message. The location of the URL signal in the MMSS 20 is an implementation detail. It can be a part of a message text component (e.g. Info text) or it can be a part of a header. Note also that the MMSS 20 can contain many URLs per MIME type.

Furthermore, a decision is made whether to download and install software to the receiving terminal 22 for rendering the originally unsupported components of the MMS 12. This decision can be made automatically by the receiving terminal 22 followed by sending a software request signal 34 based on the software location information contained in the URL signal to an Internet server 32 and subsequently, receiving 36 and installing the requested software. This decision can be also made by the user 24 after analyzing a URL image signal 26 displayed by the receiving terminal 22 or the download conditions provided by the Internet server 32 (e.g. cost of downloading the software). Especially, when multiple URLs are offered per MIME type, the user 24 decision is important as he can select the best software based on cost, memory footprint, reputation of the company providing the software, etc. If the user 24 decides to install the software, the user 24 sends a software request command 30 to the receiving terminal 22, followed by sending the software request signal 34 based on the software location information contained in the URL signal to the Internet server 32 and subsequently, receiving 36 and installing the requested software by the receiving terminal 22. The receiving terminal 22 renders the adapted version of MMS 12 (FMMS) indicative of the multimedia message, generally comprising originally supported components, adapted components (per prior art), adapted components still unsupported (with URLs available), originally unsupported components (with URLs available), and possibly originally unsupported components (without URL). Thus, the supported components of the multimedia message including originally supported and adapted components and originally unsupported components for which the additional software installed using URLs, are perceived by the user 24.

FIG. 1 illustrates only one scenario for implementation of a system described in the present invention. A number of variations and further developments are possible. For example, the MMSC 14 can have an extensive user profile database 14a containing detailed information about the receiving terminal 22 capabilities and corresponding MIME information, so it can identify the URL information for the software needed to be installed in the receiving terminal 22 for rendering the originally unsupported components of the MMS 12. In that case the MMSS 20 containing both the FMMS (adapted version of MMS 12) and the URL signal can, depending on the specific service protocol, be sent by the MMSC 14 to the receiving terminal 22 without previously sending the message notification signal 16 to the receiving terminal 22 and receiving the MRRS 18 from the receiving terminal 22. That would typically be the case in SIP Instant Messaging (IETF SIMPLE specification) where the terminal capabilities could be known from the registration of the terminal to its registrar. At registration, the terminal would provide USER-AGENT information in addition to other terminal capabilities. The SIP adaptation and inclusion of URLs could be performed in a SIP proxy which would perform the role of the MMSC 14 of FIG. 1.

Figure 2:
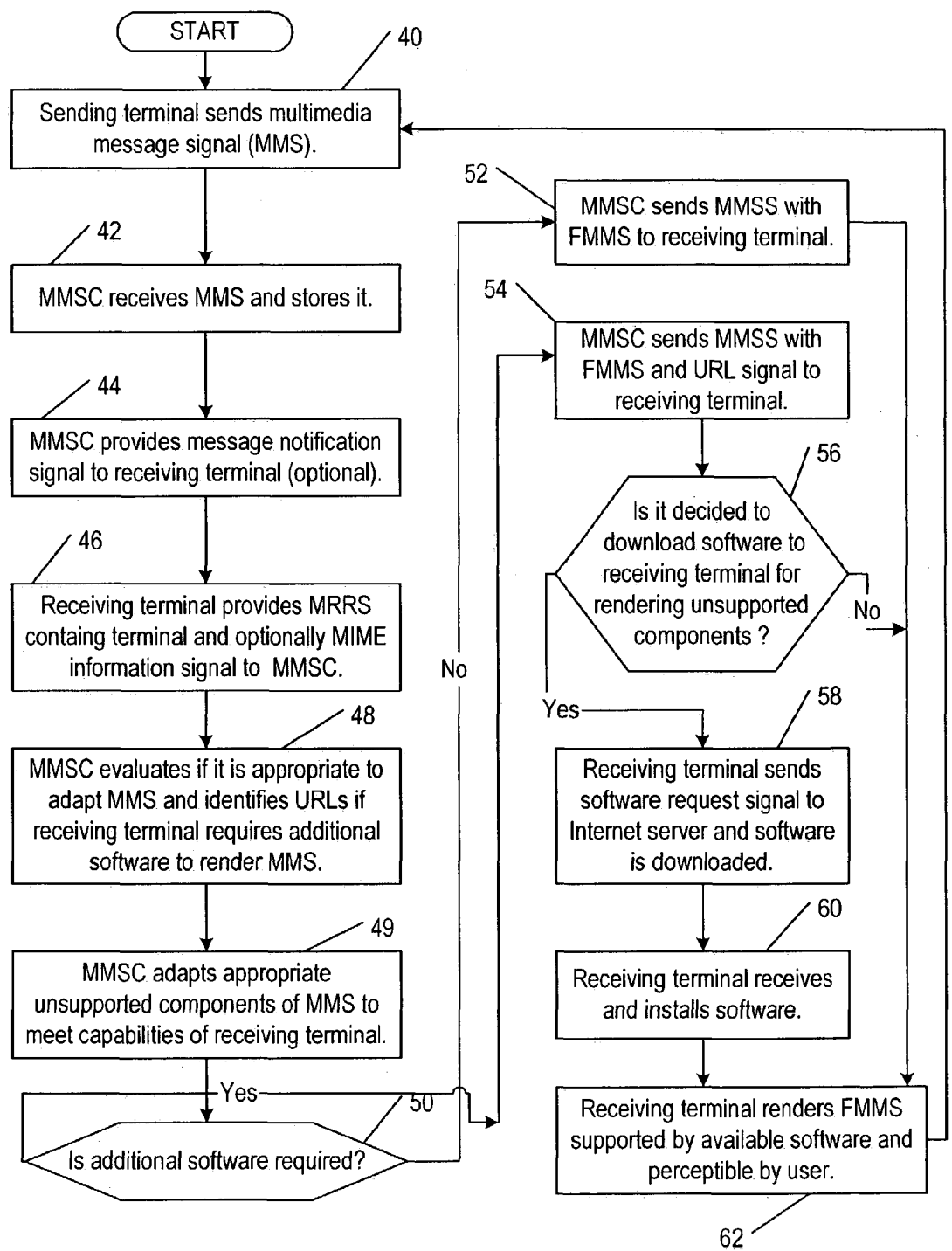
FIG. 2 is a flow chart illustrating a system performance, according to the present invention.

FIG. 2 shows a flow chart further illustrating a system performance. In a method according to the present invention, in one possible scenario, in a first step 40, a sending terminal 10 sends the multimedia message signal (MMS) 12 indicative of a multimedia message (MM) to the multimedia messaging service center (MMSC) 14. In a next step 42, the MMSC 14 receives the MMS 12 and can store it. In a next step 44, the MMSC 14 provides the message notification signal 16 to the receiving terminal 22. Step 44 can be skipped in certain situations, for example, for e-mail messages. In a next step 46, the receiving terminal 22 provides the MRRS 18 containing the terminal and MIME information to the MMSC 14. Again, depending on the specific service, this step can be skipped such as in the case of SIP Instant Messaging (for this service, this step of providing terminal capabilities can be achieved during the registration process). In a next step 48, MMSC 14 evaluates if it is appropriate to adapt the unsupported components (one or more) of the MMS 12 to meet the capabilities of the receiving terminal 22 and using its database 14*a* identifies URLs to software, which if downloaded to the receiving terminal 22 will allow the unsupported components of the MMS 12 to be rendered by the receiving terminal 22. Based on evaluation of the step 48, in a next step 49, the MMSC 14 adapts the MMS 12 by adapting the appropriate unsupported components of the MMS 12 transforming these components to meet capabilities of the receiving terminal 22. Said adapted MMS 12 is a further multimedia message signal (FMMS) indicative of the original multimedia message. The adaptation process can also include transforming unsupported components to formats still unsupported by the receiving terminal 22 but for which software is available for its proper rendering and for which URLs to such software exist. In a next step 50, it is ascertained by the MMSC 14 whether the receiving terminal 22 requires additional software for rendering the unsupported components of the FMMS. As long as no extra software is required, the MMSC 14 in a next step 52 sends the multimedia messaging service signal (MMSS) 20 containing the FMMS generated in the step 49 to the receiving terminal 22, and in a next step 62, the receiving terminal 22 renders and presents 28 the FMMS and the multimedia message is perceived by the user 24. However, if it is ascertained by the MMSC 14 that the receiving terminal 22 requires additional software for rendering the unsupported components of the FMMS, in a next step 54, the MMSC 14 sends the MMSS 20 containing the FMMS generated in the step 49 and the URL signal determined in the step 48 to the receiving terminal 22. In a next step 56, it is ascertained whether the additional software is wanted or needed to be installed in the receiving terminal 22 for rendering the unsupported components of the MMS 12. As long as that is not the case, in a next step 62, the receiving terminal 22 renders the supported components of the FMMS and information provided 28 by the supported components of the multimedia message is perceived by the user 24. If it is decided that additional software is required, in a next step 58, a request signal is provided on a line 34 from the receiving terminal 22 to the Internet server 32 and additional software is downloaded on a line 36 from the Internet server 32 to the receiving terminal 22. The receiving terminal 22 receives and installs the requested software as shown in a next step 60 following the software downloaded signal 36 sent to the receiving terminal 22 from the Internet server 32. Finally, in a step 62, the receiving terminal 22 renders the FMMS supported by the originally available or just installed software in the receiving terminal 22 and thus, the supported components (supported components and unsupported components for which the additional software installed using the URLs) of the multimedia message are perceived 28 by the user 24.

It should be realized that many variations of the above-described methodology are possible. For instance, the step 54 shown in FIG. 2 could be broken down into two steps where the MSS and URL signals are sent separately or where the ordering of the illustrated steps is altered. Thus, the signal on the line 20 should be understood in that sense. Another example of variation is when the MMSC is a Web server. In that case, there is no sending terminal 10. The MMS 12 is a multimedia content (e.g. a Web page) stored in the MMSC 14. The receiving terminal 22 sends the message retrieval request signal 18 to the MMSC 14 to obtain the multimedia content. The MMSC 14, realizing that the terminal cannot support all components of the multimedia content but that terminal-specific software exist for solving the problem, sends the MMSS 20 containing the multimedia content and the URL signal supporting said software.

Finally, the adaptation of the multimedia message does not need to take place in the MMSC 14 but can be performed in a separate server to which the MMSC requests message adaptation to be performed including inclusion of the earlier described URLs. Furthermore, in general the receiving terminal 22 can receive the MMSS 20 containing the FMMS and the URL signal from a different server and not necessarily form the MMSC 14.

What is claimed is:

1. A method, comprising the steps of:
   evaluating by a multimedia messaging service center whether it is appropriate to adapt originally unsupported components of a multimedia message to meet capabilities of a receiving terminal before providing said multimedia message to said receiving terminal and, if said adaptation is not enough for supporting all of said unsupported components using said capabilities, identifying an internet server location of software needed for rendering unadopted components of said originally unsupported components by said receiving terminal;
   providing by a multimedia messaging service center directly to a said receiving terminal a multimedia messaging service signal incorporating both: a) a further multimedia message signal (FMMS) indicative of said multimedia message and b) a URL signal which provides said internet server location of said software obtainable by the receiving terminal; and
   providing the software to the receiving terminal for said rendering of said unadopted components of the multimedia message by the receiving terminal using said URL signal.

2. The method of claim 1, wherein the software is provided to the receiving terminal in response to a software request signal sent by the receiving terminal to the internet server location provided by the URL signal.

3. The method of claim 2, wherein the software request signal is sent by the receiving terminal to the internet server location provided by the URL signal only after receiving a software request command from a user.

4. The method of claim 2, wherein the software request signal is sent by the receiving terminal to the internet server location provided by the URL signal automatically after receiving the multimedia messaging service signal incorporating the URL signal.

5. The method of claim 1, after the step of providing the multimedia messaging service signal, further comprising the step of:
   deciding whether additional software is needed to be installed in the receiving terminal for rendering said unadopted components of said originally unsupported components of said a multimedia message by the receiving terminal.

6. The method of claim 5, wherein said decision is made by the user.

7. The method of claim 5, wherein said decision is made automatically by the receiving terminal.

8. The method of claim 1, further comprising the step of:
   rendering the further multimedia message signal indicative of the multimedia message by the receiving terminal, so that the multimedia message is perceptible by a user.

9. The method of claim 1, prior to the step of providing the multimedia messaging service signal, further comprising the step of:
receiving and optionally storing a multimedia message signal comprising said multimedia message by the multimedia messaging service center.

10. The method of claim 9, further comprising the steps of:
providing optionally a message notification signal (16) to the receiving terminal by the multimedia messaging service center; and
providing a message retrieval request signal containing a terminal signal indicative of a terminal information and optionally a multipurpose internet mail extension (MIME) signal indicative of a terminal-specific MIME information to the multimedia messaging service center by the receiving terminal.

11. The method of claim 10, wherein the message retrieval request signal is sent in response to the message notification signal.

12. The method of claim 10, wherein said step evaluating and identifying is performed using the terminal and MIME signals using a database of the multimedia messaging service center.

13. The method of claim 12, further comprising the step of:
adapting by the multimedia messaging service center the appropriate unsupported components of the MMS to meet the capabilities of the receiving terminal.

14. The method of claim 10, wherein the MIME information is deduced by the multimedia messaging service center from the terminal information contained in the message retrieval request signal and from a software release information.

15. The method of claim 10, wherein a terminal signal indicative of a terminal information is provided to the multimedia messaging service center during a registration process of a particular application.

16. The method of claim 15, wherein the particular application is a session initiation protocol (SIP) instant messaging or a SIP messaging session.

17. The method of claim 15, wherein a terminal-specific multipurpose internet mail extension (MIME) information is deduced by the multimedia messaging service center from the terminal information and from a software release information.

18. The method of claim 1, wherein the further multimedia message signal is the same as the multimedia message signal and all said unadopted components are said originally unsupported components.

19. A system, comprising:
a multimedia messaging service center, for evaluating whether it is appropriate to adapt originally unsupported components of a multimedia message to meet capabilities of a receiving terminal before providing said multimedia message to said receiving terminal and, if said adaptation is not enough for supporting all of said unsupported components using said capabilities, identifying an internet server location of software needed for rendering unadopted components of said originally unsupported components by said receiving terminal; for providing a multimedia message service signal incorporating both: a) a further multimedia message signal (FMMS) indicative of said multimedia message and b) a URL signal which provides said internet server location of said software; and
a receiving terminal responsive to the multimedia message service signal sent directly to the receiving terminal, for obtaining said software for said rendering of said unadopted components of the multimedia message.

20. The system of claim 19, wherein the multimedia messaging service center is further responsive to a multimedia message signal indicative of the multimedia message and to a message retrieval request signal containing a terminal signal indicative of a terminal information and optionally a multipurpose internet mail extensions (MIME) signal indicative of a terminal-specific MIME information.

21. The system of claim 20, wherein the multimedia messaging service center further provides a message notification signal to the receiving terminal.

22. The system of claim 19, wherein the receiving terminal is responsive to a software request command by a user, for providing a message retrieval request signal containing a terminal signal indicative of a terminal information and optionally a multipurpose internet mail extensions (MIME) signal indicative of a terminal-specific MIME information, for providing a software request signal to the internet server, for providing a URL image signal to the user, and for rendering the further multimedia message signal indicative of the multimedia message perceptible by the user.

23. The system of claim 22, wherein the receiving terminal, is further responsive to a message notification signal.

24. The system of claim 19, further comprising a sending terminal, for providing a multimedia message signal to the multimedia messaging service center.

25. The system of claim 19, wherein the further multimedia message signal is the same as the multimedia message signal and all said unadopted components are said originally unsupported components.

26. A computer program for storage on a computer readable medium for executing the steps of claim 1.

27. A multimedia messaging service center, comprising:
a database for identifying uniform resource locators (URLs) of terminal-specific downloadable software;
means for evaluating whether it is appropriate to adapt originally unsupported components of a multimedia message to meet capabilities of a receiving terminal before providing said multimedia message to said receiving terminal and, if said adaptation is not enough for supporting all of said unsupported components using said capabilities, identifying, using said database an internet server location of software needed for rendering unadopted components of said originally unsupported components by said receiving terminal; and
means for providing directly to said to said receiving terminal a multimedia message service signal which incorporates both: a) a further multimedia message signal (FMMS) indicative of said multimedia message and b) a URL signal, which provides said internet server location of said software for said rendering of said unadopted components of the multimedia message by the receiving terminal.

28. A receiving terminal, comprising:
means directly responsive to the multimedia message service signal which incorporates both: a) a further multimedia message signal (FMMS) indicative of a multimedia message and b) a URL signal which provides an internet server location of software obtainable by the receiving terminal; and
means for sending a software request signal to the internet server location provided by the URL signal, wherein said software is needed for rendering unadopted components of an originally unsupported components of a multimedia message by said receiving terminal, wherein prior to providing said URL signal, it is evaluated whether it is appropriate to adapt originally unsupported components of a multimedia message to meet capabilities of said receiving terminal before providing said multimedia message to said receiving terminal and, if said adaptation is not enough for supporting all of said unsupported components using said capabilities, said internet server location of said software is identified, wherein said software is needed for said rendering said unadopted components of said originally unsupported components by said receiving terminal.

29. A method, comprising the steps of:

evaluating whether it is appropriate to adapt originally unsupported components of a multimedia message to meet capabilities of a receiving terminal before providing said multimedia message to said receiving terminal and, if said adaptation is not enough for supporting all of said unsupported components using said capabilities, identifying an internet server location of software needed for rendering unadopted components of said originally unsupported components by said receiving terminal;

providing directly to said receiving terminal a multimedia messaging service signal incorporating a further multimedia message signal (FMMS) indicative of both: a) said multimedia message and b) a URL signal which provides said internet server location of said software obtainable by the receiving terminal; and providing the software to the receiving terminal for said rendering of said unadopted components of the multimedia message by the receiving terminal using said URL signal.

30. A computer program product comprising: a computer readable storage structure embodying computer program code thereon for execution by a computer processor with said computer program code characterized in that it includes instructions for performing the steps of the method of claim 29 indicated as being performed by any component of the receiving terminal.

31. The method of claim 1, wherein said URL signal is message text component or apart of a header.

32. The system of claim 19, wherein said URL signal is message text component or a part of a header.

* * * * *